May 14, 1957     W. J. GREENLEAF     2,791,824
INDEXABLE INSERT TOOL HOLDER
Filed March 15, 1955
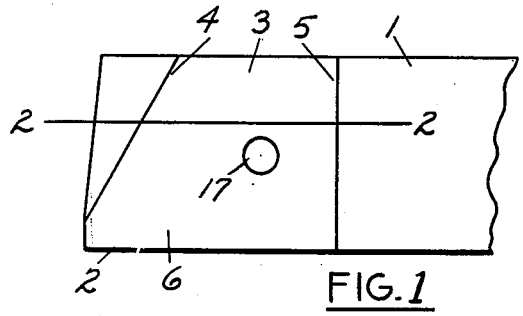
FIG. 1
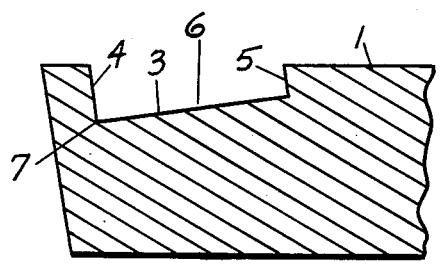
FIG. 2
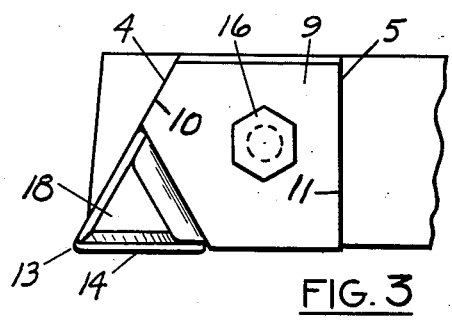
FIG. 3
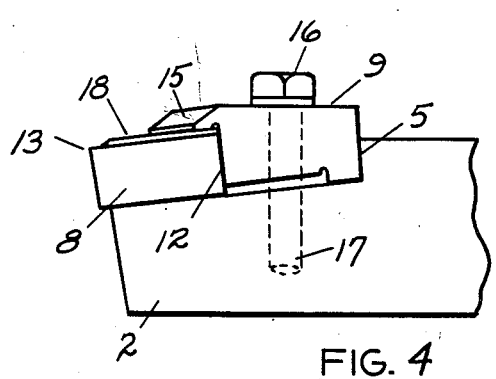
FIG. 4
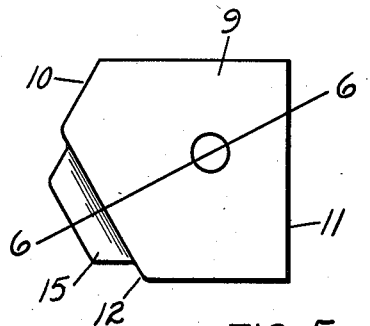
FIG. 5
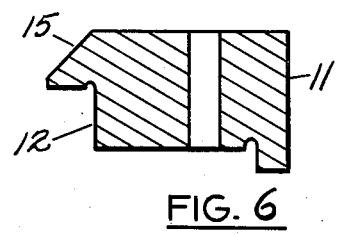
FIG. 6
FIG. 7
INVENTOR.
Walter J Greenleaf
BY
Ralph Hammar
attorney

United States Patent Office 2,791,824
Patented May 14, 1957

2,791,824
INDEXABLE INSERT TOOL HOLDER

Walter J. Greenleaf, Meadville, Pa.

Application March 15, 1955, Serial No. 494,388

1 Claim. (Cl. 29—96)

In metal cutting tools using short or thin indexable carbide insert bits, it is imperative that the bits be firmly supported by accurately related surfaces so that the bits will not fracture and so that as the bits are indexed either by rotation or by turning end for end the relation of the active cutting edge to the holder will not change. With a triangular insert, the bit can be indexed to bring six successive cutting edges into active or cutting position and when all six edges have become dull, the bit is thrown away and a new bit substituted.

This invention is intended to provide a holder for insert bits which can be easily made, and which will accurately locate and support the bits. In a preferred form for use with triangular bits, there is a groove open at both ends and extending across the holder in the general direction of the cutting thrust. The bottom of the groove is a flat hardened surface in a plane inclined so that the bit resting thereon will have the proper cutting clearance. The front and back sides of the groove are perpendicular to the bottom and converge in the direction of the cutting thrust. Because the groove is open at both ends, it can be formed by simple milling cuts straight across the holder and after hardening can be finish ground by straight passes of a grinding wheel. The front side of the groove engages and locates one side edge of the bit. The back side of the groove engages a filler piece which cooperates with the front side of the groove to make a V shaped notch receiving and supporting the adjacent side edges of the bit and taking the cutting thrust. The filler piece may be a top clamp for holding the bit seated against the bottom of the groove.

In the accompanying drawing, Fig. 1 is a top view of a holder with the bit and filler piece removed; Fig. 2 is a section on line 2—2 of Fig. 1; Fig. 3 is a top view of the holder with the bit and filler piece in place; Fig. 4 is a side view of Fig. 3; Fig. 5 is a top view of the filler piece; Fig. 6 is a section on line 6—6 of Fig. 5 and Fig. 7 is a perspective of a triangular bit.

In the drawing there is shown a holder having a shank 1 and a head 2 for receiving triangular cutting bits. Extending across the top of the head is a groove 3 open at both ends and having a front side 4 and a back side 5 converging in the general direction of the cutting thrust. The sides 4 and 5 are perpendicular to the flat bottom surface 6 of the groove which is in a plane inclined so that a bit resting thereon will have the proper cutting clearance. Because the groove 3 is open at both ends, it can be made by simple milling operations with the milling cutters traversing paths parallel to the sides 4 and 5. This is possible because the open ends of the groove provide clearance for the milling cutters. Furthermore, after hardening, the sides 4, 5 and 6 can be finish ground by having the grinding wheel traverse paths parallel to the sides 4 and 5. The finish grinding removes any distortion resulting from hardening. The sharp corners 7 receive the lower corners of the bit 8 which are the sharp cutting edges.

To accurately hold the bit 8, a filler piece 9 having sides 10 and 11 mating with the sides 4 and 5 is used to close the narrow end of the groove 3. The filler piece has an angular side 12 which cooperates with the side 4 to form a V shaped notch receiving a triangular cutting bit. Because the converging sides 10 and 11 on the filler piece 9 are accurately made to match the converging sides 4 and 5 of the groove 3 in the holder, the filler piece is accurately located on the holder and the notch between the sides 12 and 4 accurately determines the position of the triangular bit 8 so that the exposed tip 13 and the exposed front edge 14 of the bit will have a definite and accurately fixed location with respect to the holder. Since the bits 8 are accurately made, no matter how the bits are turned, the exposed cutting point 13 and the exposed front edge 14 will always have the same relation to the cutting head. This is important in indexable bits because the accuracy of the cut should not be changed as the bit is indexed to bring a new cutting edge into the exposed or active cutting position.

In a preferred form the filler piece 9 is a clamp having a projection 15 extending out over the upper surface of the bit 8. The clamp is fastened to the holder by a bolt 16 threaded in a tapped hole 17. A thin wafer 18 of carbide formed as a chip breaker may be placed on top of the bit beneath the clamping projection 15.

In the use of the tool, loosening of the bolt 16 relieves the clamping pressure of the projection 15 on the bit 13 and permits the bit to be moved out of the notch between the side 4 on the holder and the side 12 on the clamp and turned so as to expose a new cutting edge 14. Because of the V shaped or angular relation of the sides 12 and 4, the bit is accurately located and when indexed so as to expose a new cutting edge will have the same cutting position. Tightening of the bolt 16 securely locks the cutting bit in the new indexed position. The accuracy of location of the bit is not determined by the bolt 16. The accuracy is determined by the fit of the converging sides 10 and 11 of the clamp between the converging sides 4 and 5 of the holder. The convergence of these sides serves to accurately locate the clamp and thereby accurately locate the bit.

All of the parts of the holder can be accurately made by a simple machining operation. The holder can be made by simple milling and grinding operations. The same is true of the clamp 9. None of the difficult and expensive end milling operations for forming a notch are needed. The tool, accordingly, is much cheaper to make than any of the tools where the triangular bit is held in a notch in the holder. Furthermore, the tool is easy to maintain. If the bottom seat surface 6 of the holder is damaged so that it is no longer flat, it may be refinished by a simple surface grinding operation. Since the thin bits 8 which are intended to be used once and then thrown away require an absolutely flat bottom seating surface, it is very desirable that this surface be maintained in a flat condition which can be easily done with the present construction.

What is claimed as new is:

In a cutting tool having a body for attachment to a machine tool and a head for carrying an indexable throwaway bit of triangular cross-section and of length less than any other dimension and with its longitudinal axis extending in the general direction of the downward component of the cutting thrust, said head having a groove extending crosswise from one side of the head in the direction of the lateral component of the cutting thrust, the bottom of the groove having a flat seating surface adjacent the front side of the groove and said one side of the head perpendicular to the longitudinal axis of the bit and inclined so that a bit resting thereon will have the desired cutting clearance, said groove having straight front and back sides perpendicular to the bottom of the groove spaced furthest from each other at said one side of the head and converging in the general direction of the lateral component of the cutting thrust whereby the groove becomes narrower in the direction of the lateral component of the cutting thrust, the width of the groove being substantially greater than the width of the bit and sufficient to permit milling of the groove by cuts parallel to the front and back sides and to permit surface grinding of the seat by passes along the front side of the groove, the front side of the groove being adjacent but spaced from the front of the head so as to leave an upstanding portion at the front of the head and said front side of the groove directly engaging and locating one side of the bit, a clamp fitting in the groove and in conjunction with the bit closing the wide end of the groove, said clamp having a side engaging the back side of the groove and having another side at the wide end of the groove intersecting the front side of the groove and engaging and locating the side of the bit adjacent said one side of the bit and thereby providing a set location for said clamp and for the side of the bit engaging the clamp, said clamp having a projection extending out over the top of the bit, and releasable means for urging the projection down against the top of the bit.

References Cited in the file of this patent

UNITED STATES PATENTS

| | | |
|---|---|---|
| 2,452,877 | Sheridan | Nov. 2, 1948 |
| 2,598,581 | McKenna | May 27, 1952 |
| 2,623,272 | Greenleaf | Dec. 30, 1952 |
| 2,716,800 | Bader | Sept. 6, 1955 |

FOREIGN PATENTS

| | | |
|---|---|---|
| 1,078,179 | France | Nov. 16, 1954 |